Aug. 11, 1959    J. C. BARR    2,898,731
POWER PRODUCING EQUIPMENT INCORPORATING GAS TURBINE PLANT
Filed Sept. 8, 1954

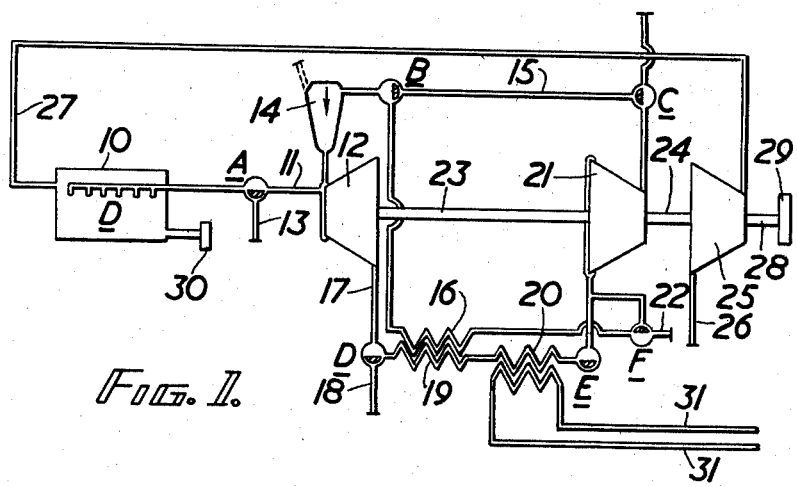

FIG. 1.

| MODES OF OPERATION | | | | | | | |
|---|---|---|---|---|---|---|---|
| | DESCRIPTION OF OPERATING METHOD | VALVE SETTINGS | | | | | |
| | | A | B | C | D | E | F |
| I | DIESEL ONLY | ◐ | ◐ | ◒ | ◒ | ◒ | ◐ |
| II | DIESEL & INVERTED CYCLE G.T. | ◒ | ◐ | ◐ | ◒ | ◒ | ◒ |
| III | DIESEL & INVERTED CYCLE G.T. WITH SEPARATE STREAM OF WORKING FLUID INDUCED | ◒ | ◐ | ◐ | ◒ | ◒ | ◒ |
| IV | DIESEL & INVERTED CYCLE G.T. WITH SEPARATE STREAM & HEAT INPUT | ◒ | ◐ | ◐ | ◒ | ◒ | ◒ |
| V | DIESEL & DIRECT CYCLE G.T. | ◐ | ◒ | ◒ | ◐ | ◒ | ◐ |

FIG. 2.

INVENTOR
John Charles Barr
BY Stevens Davis, Miller Mosher
ATTORNEYS

United States Patent Office 2,898,731
Patented Aug. 11, 1959

2,898,731

POWER PRODUCING EQUIPMENT INCORPORATING GAS TURBINE PLANT

John Charles Barr, Ascot, England, assignor to Power Jets (Research & Development) Limited, London, England, a British company Application September 8, 1954, Serial No. 454,659

Claims priority, application Great Britain September 11, 1953

1 Claim. (Cl. 60—13)

This invention relates to power producing equipment incorporating gas turbine plant and to equipment in which such plant is combined with a reciprocating internal combustion engine.

The invention makes use of gas turbine plant operating according to the so-called "inverted" open cycle. That cycle is one in which a ducted stream of hot working fluid is, in its direction of flow, successively expanded in a turbine, cooled, compressed approximately to atmospheric pressure, and exhausted to atmosphere.

It has previously been proposed to employ hot waste gases at approximately atmospheric pressure as the working fluid for an inverted cycle. It has also been suggested that another stream of gas may conveniently be mixed with the main stream of working fluid at a point upstream of the turbine therein and it can be previously heated by cooling the total working fluid downstream of the turbine.

It is an object of the invention to improve the operating flexibility of inverted cycle gas turbine plant.

It is another object of the invention to provide power producing equipment incorporating gas turbine plant and a reciprocating internal combustion engine combined in a satisfactory manner.

The present invention provides that in power producing equipment incorporating such inverted cycle gas turbine plant there shall be a controllable source of heat input to said other stream.

Power producing equipment according to the invention may also comprise a reciprocating internal combustion engine whose exhaust gases are passed to the gas turbine plant which in turn may drive a supercharger for the engine. The gas turbine plant can conveniently be arranged to operate both in an inverted or direct open cycle.

Particular advantages accrue when the internal combustion engine is a diesel engine.

According to a further feature of the invention there is provided power producing equipment incorporating open cycle gas turbine plant comprising apparatus providing intake, compression, expansion, controllable heat input, cooling and exhaust stages for the working fluid and valve means effective to arrange the cycle of operation for the working fluid in the order intake, heat input, expansion, cooling compression and exhaust or in the order intake, compression, heat input, expansion and exhaust.

The invention will now be described, by way of example only, by reference to an open cycle gas turbine-cum-diesel engine combination shown in the accompanying diagrammatic cycle diagram, Figure 1, and operational chart, Figure 2.

The plant whose layout is shown in Figure 1 incorporates a diesel engine 10. The engine exhaust is fed from the manifold to the valve A whose positioning controls whether it passes through the duct to the inlet of turbine 12 or via the pipe 13 directly to the atmosphere. Also connected to the turbine inlet duct is the combustion chamber 14 whose inlet end is connected to the valve B. That valve in turn gives access either to the valve C through the ducting 15 or to one side of the heat exchanger 16.

The outlet duct 17 from the turbine is connected directly to a valve D which has access either to the atmosphere through the pipe 18 or to the other side of the same heat exchanger as shown at 19. The other end of the same side 19 of the heat exchanger is connected through another heat exchanger 20 to the valve E. A duct is also connected to the valve E from the inlet scroll of the compressor 21. A pipe 22 open to the atmosphere is connected to the valve F and the latter gives access either to the inlet scroll of the compressor 21 or the side 16 of the first mentioned heat exchanger.

The turbine 12 and the compressor 21 are mounted upon the same shaft 23 and the combination is intended for self-driving operation. The shaft 23 is extended beyond the compressor 21 as shown at 24 and mounted on that shaft is a supercharging blower 25. Air is able to enter this blower through the pipe 26 open to the atmosphere and the pressurised air developed is fed via the pipe 27 to the diesel engine 10. An extension 28 of the shaft 23, 24 terminates in a coupling 29 from which shaft power may be derived. Shaft power may also be derived directly from the coupling 30 on the diesel engine shaft. The two couplings may be mechanically connected if desired. Heat given up in the heat exchanger 20 can be extracted through the water cooling circuit 31.

The plant shown in Figure 1 is operable in a number of different ways. The various modes of operation are set out in a chart which is shown in Figure 2. In the first instance the diesel engine only is in operation and all the power output is given through the coupling 30. The exhaust of the diesel engine is taken to atmosphere through pipe 13 and the working passages of the gas turbine plant sealed off from the atmosphere by the valves C, D and F. It will be appreciated that the marked segments in the chart indicate valve positions and correspond with the positioning of the valves in Figure 1.

In the second mode of operation the exhaust gases from the diesel engine are not passed to atmosphere through the pipe 13 but instead are taken through the ducting 11 to the inlet of the turbine 12. The exhaust gases are, of course, hot and little above atmospheric pressure. In the turbine 12, the gases are expanded to below atmospheric pressure and then they are fed by way of the heat exchangers 19 and 20 to the compressor 21. It will be noted that the valves A and D and E are shown correctly positioned for this mode of operation in the Figure 1 diagram. In this instance the valve B is closed to any stream of air passing from the heat exchanger side 16 to the combustion chamber 14 so that there is no flow through that side of the heat exchanger. Consequently no heat is given up by the gas flow through the side 19. The water cooling circuit 31 is however in operation and heat is given up by the gases to the water. The cooled gases pass through the compressor which is driven by the turbine 12 and there they are compressed to atmospheric pressure or a little above and exhausted to the atmosphere by way of the valve C and the connection to the atmosphere to which it gives access.

In the third mode of operation use is made of a previous proposal that with an inverted cycle a separate stream of working fluid should be introduced and mixed with the main stream immediately upstream of the turbine. This separate stream is in this instance fresh air and as it is passed through the heat exchanger 16 it is enabled to take up some heat from the expanded exhaust gases passing through the other side of that exchanger at 19. In order to pass from the second to the third mode of operation all that is required is that the position of valve B shall be altered to provide a flow path through the connection to the atmosphere from the valve F at 22 through the heat exchanger 16, the valve B, combustion chamber 14 and the inlet to the turbine 12. A fan may be incorporated if necessary for sucking in this air at the connection 22. The power output at the coupling 29 is readily controllable in this case by burning fuel in the combusion chamber 14 and metering the fuantity of fuel delivered to the combustion chamber in accordance with the power output that is required. Where a considerable quantity of fuel is being burnt in the combustion chamber 14 then additional air supply may be required for that chamber and the supply pipe is shown dotted. The provision of heat input in this manner by burning fuel in the combusion chamber may be considered as another mode of operation of the plant although the valve positions remain as they were in the third mode.

Where considerable shaft power is required the compressor gas turbine set may be operated on a simple open cycle instead of on the inverted cycle previously described, by appropriate positioning of the valves A to F. In this fifth mode of operation the exhaust from the diesel engine is again taken to the atmosphere via the pipe 13 and the working fluid for the gas turbine cycle is introduced through the inlet 22. The valve F is now in such a position that this fresh air inspired is taken direct to the compressor 21 the valve E being in such a position as to prevent any air passing into the heat exchanger 20. Compressed air from the compressor 21 passes to the valve C and that valve is in such a position as to prevent egress to the atmosphere and to direct the compressed air to the ducting 15. Thence it passes through the valve B to the combustion chamber 14. The compressed hot gases from the combustion chamber pass to the turbine 12 and through the pipes 17 and 18 to the atmosphere after expansion. In this instance the pressure levels of the working fluid in the compressor and turbine are raised above their corresponding level in the inverted cycle case and in consequence considerably greater power output is available.

It will be appreciated that the arrangement described enables various modes of operation to be achieved, from the ordinary diesel engine operating by itself to the combination of a diesel engine and a gas turbine operating on a simple open cycle. In between these two extremes are several possibilities with varying degrees of thermal efficiency of the whole equipment and different power outputs. In considering an increase in thermal efficiency of the whole plant it is well to remember that 40% of the heat content of the fuel input to a normal diesel engine is lost to the exhaust and if 15% of this is recovered in a gas turbine plant then that is equivalent to increasing the overall thermal efficiency by 6%.

During operation of the combustion chamber 14 the mass flow of gas to the turbine is increased as well as its temperature. Consequently the turbine inlet pressure has to be increased unless its capacity is altered. If the diesel engine cannot have a back pressure increase imposed upon it the latter remedy must be applied and variable inlet guide vanes provide a satisfactory solution. The compressor may need also to have variable diffuser guide vanes or alternatively it may be given a wide operating range with a vaneless diffuser design.

Those skilled in the art will appreciate that the combination of an internal combustion engine and an inverted cycle gas turbine plant has advantages over the prior proposals to employ a gas turbine driven by the exhaust of such an engine in that the inverted cycle plant need impose no substantial back pressure upon the engine. The engine is therefore able to do its work at its normal output and its usefulness is not reduced in any way by the additional provision of the gas turbine plant.

In applications of such plant good thermal efficiency is provided and considerable additional boost power is available. One control lever may be operable to position the valves and meter the fuel input. One possible application is to the generation of electrical power where peak loads are experienced. Either the diesel engine or the gas turbine operating on the open cycle might be available to provide the normal power output, the diesel of course being more efficient thermally than the simple open cycle gas turbine. Nevertheless the ability of either one or the other being able to supply the normal load enables the diesel to be taken out of use for any necessary maintenance. The combination of the diesel engine and the gas turbine plant (inverted or simple open cycle) could cope with all loads up to the allowable limit.

Whilst the above particular description has specified the internal combustion engine of the invention being a diesel engine that is only because the greatest advantages accrue to the invention where that is the case. The thermal efficiency of the diesel engine being reasonably satisfactory to begin with further savings in the considerable heat now passed to the exhaust of such engines produces very considerable advantage.

What I claim is:

Power plant comprising in combination rotary compression means, a turbine, a driving connection between the compression means and the turbine, a combustion chamber, a heat exchanger, a first duct system connecting an outlet of the turbine through one side of the heat exchanger to the inlet of the compression means, a second duct system connecting an outlet of the compression means through the combustion chamber to the inlet of the turbine, a third duct system connecting an atmospheric air inlet through the other side of the heat exchanger to the second duct system upstream of the combustion chamber, an internal combustion engine, a duct connecting the exhaust of the engine to the inlet of the turbine, first valve means in said first duct operable in a first position to provide a free gas flow through said first system, and in a second position to provide an outlet to the atmosphere for gas from the turbine, second valve means in the second duct system operable in a first position to provide a free gas flow through said second system, and in a second position to provide an outlet to the atmosphere for gas from the compression means, and a third valve means in the third duct system operable in a first position to provide a free gas flow through said third system and in a second position to prevent said free gas flow.

References Cited in the file of this patent

UNITED STATES PATENTS

| | | |
|---|---|---|
| 999,976 | DeFerranti | Aug. 8, 1911 |
| 2,263,370 | Von Tavel | Nov. 18, 1941 |
| 2,375,006 | Larrecq | May 1, 1945 |
| 2,580,591 | Pouit | Jan. 1, 1952 |
| 2,633,698 | Nettel | April 7, 1953 |
| 2,654,991 | Nettel | Oct. 13, 1953 |
| 2,731,798 | Welsh et al. | Jan. 24, 1956 |

FOREIGN PATENTS

| | | |
|---|---|---|
| 387,264 | Great Britain | Feb. 2, 1933 |